July 30, 1935.  D. E. WEBSTER  2,009,598
SAW TOOTH
Filed March 20, 1934
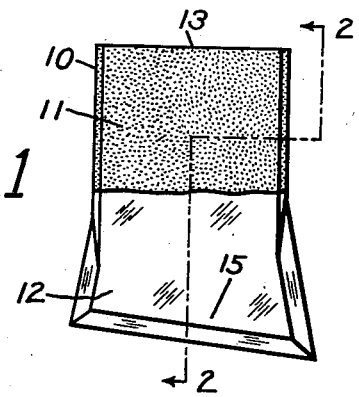
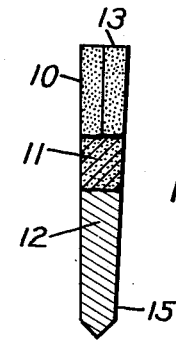
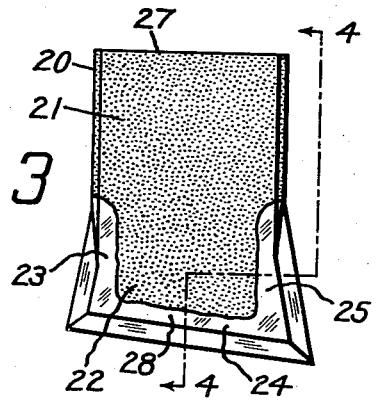
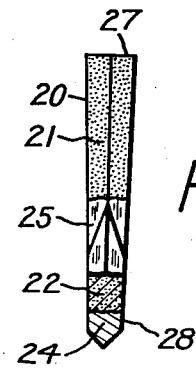
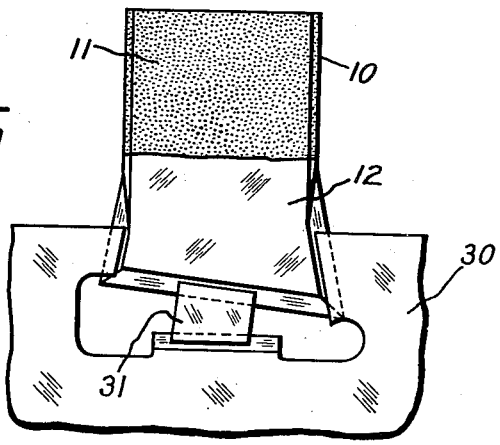
WITNESSES
Franklin E. Johnson
W R Greenwood
Inventor
DUANE E. WEBSTER
By Clayton L. Jenks
Attorney Patented July 30, 1935

2,009,598

UNITED STATES PATENT OFFICE 2,009,598

SAW TOOTH

Duane E. Webster, Worcester, Mass., assignor to Norton Company, Worcester, Mass., a corporation of Massachusetts Application March 20, 1934, Serial No. 716,517

6 Claims. (Cl. 125—22)

This invention relates to saw teeth, and particularly to saw tooth segments of bonded abrasive material which are removably mounted in rotary or reciprocable saws of the inserted tooth type for sawing stone and other materials.

Heretofore, saws have been provided with insertible abrasive saw teeth which were made of abrasive grains and shellac molded on the edge of a thin metal plate containing perforations or notches for holding the molded cutting material. The plates carrying the molded teeth thus made were inserted into suitable sockets in the saw blade and secured therein by rivets or wedges. This type of tooth had many disadvantages, and while it was not only expensive to manufacture it was particularly objectionable due to the fact that the molded cutting material tended to loosen easily and broke away from the metal plate on which the abrasive material had been molded. This condition was found to be caused by a shearing-off of the molded abrasive material which passed through the holes and notches of the plate which thereby allowed the tooth to break loose and drop from the plate.

Abrasive saw teeth have been made more recently as a solid body formed of abrasive grains bonded by shellac or other standard bonding material. This improved saw tooth has been provided with double-beveled side and base portions for mounting the tooth in the saw blade. The sockets which are adapted to hold the teeth have V-shaped grooves in their side walls to engage the correspondingly beveled side portions of the teeth, and each tooth is held in place in its socket by means of a wedge block slidably arranged in the socket. The wedge carries a V-groove at the upper edge to fit the beveled edge at the base of the tooth, and a V-bevel at the bottom edge to fit a corresponding V-groove at the bottom of the tooth socket. This type of tooth has, however, been unsatisfactory and caused considerable trouble, owing to the abrasive character of the side and base portions of the tooth which engaged the side walls of the saw socket and the beveled seat of the wedge block, respectively. Thus, the wedge block becomes badly worn by the abrasive material, as the wedge is driven in further to tighten the tooth in the socket so that any slight movement of the abrasive tooth in the saw socket to accomplish this purpose wears the V-grooves in the sides of the socket. As a consequence, it is necessary at frequent intervals to build up the sides of the sockets in the saw by welding more metal thereon and then reshaping the sockets and V-grooves. In practice, it also has been customary in many cases to furnish a complete set of wedge blocks with each set of new saw teeth, so that the inserted teeth could be better fitted and positioned in the saw sockets. Because of these various defects, it has resulted that the individual saw teeth would project to different heights beyond the edge of the saw blade, with the result that only a few of the saw teeth would contact with the work at the beginning of a cutting and grinding operation, which not only caused excessive blows on the teeth which cut down the efficiency of the saw-cutting operation, but also tended to cause breakage of the tooth or injury to the work.

The primary object of this invention is to overcome these various disadvantages and to provide an abrasive saw tooth segment, which is capable of being mounted in a socket in a metal saw blade of the inserted tooth type and will make a proper fit with the side walls thereof, and which when so attached may be used without danger of abrading the metal parts of the saw blade, and yet will fit the same accurately and smoothly and may be positioned correctly for a cutting and grinding operation.

With this and other objects in view, as will be apparent from the following disclosure, the invention resides in the composition and structure set forth in the specification and covered by the claims appended hereto.

Referring to the drawing, in which like reference numerals indicate like parts:

Fig. 1 is a side view of one form of abrasive saw tooth segment embodying the invention;

Fig. 2 is a fragmentary sectional view of a segment, taken on line 2—2 of Fig. 1;

Fig. 3 is a side view, of a modified saw tooth construction embodying the invention;

Fig. 4 is a fragmentary sectional view, of the modified segment, taken on line 4—4 of Fig. 3; and Fig. 5 shows one standard method of mounting an abrasive segment tooth in a saw blade.

In accordance with this invention, I propose to make an abrasive saw tooth segment which is adapted to be mounted and secured in the socket portion of a metal saw blade of the inserted tooth type without any tendency to work loose or to wear the holding portions of the tooth socket by abrasion while being tightened or replaced therein. To this end, I provide the base or shank section of the segment tooth with a non-abrasive mounting or holding portion which is united integrally with the abrasive and effective sawing portion of the saw tooth segment. In the practice of the invention, I may make either the lower edge portions surrounding the base of the saw tooth or the entire shank portion per se of a material of a non-abrasive character, and I have found the bonding material which is used to bond the granular abrasive material in the grinding or abrasive section of the tooth to be particularly suited for the purpose, so that the entire tooth will be composed of substantially the same type of material and will constitute a solid, unitary body. Also, this non-abrasive base section is preferably formed of a material which may be shaped accurately in a mold so as to precisely fit the saw tooth socket when inserted and mounted therein. Thus, the non-abrasive portion is preferably composed of an organic bonding material, such as a resinoid, vulcanized rubber or shellac, which may be molded and formed integrally in situ with the abrasive section of the tooth in accordance with standard molding procedure employed in molding plastic products. It also is particularly desirable that the non-abrasive section have a strength as great as that of the abrasive section of the segment.

The abrasive portion of the saw tooth may consist of abrasive grains of a suitable character and grit size, such as grains of crystalline alumina, silicon carbide or other standard abrasive materials, bonded together into an integral mass by the bonding material in suitable proportions to form a desired grinding structure. The composition employed for the non-abrasive base portion may contain suitable fillers of a non-abrasive character and in a finely divided condition, such as wood flour, clay grog, asbestos or cotton flock, in proper proportions, which serve to render the mass moldable and otherwise aid in the manufacturing operation so as to strengthen or improve the characteristics of the base or non-abrasive section. If clay grog is to be employed as the filling material in the non-abrasive section, the grog is composed of particles of clay, such as fire clay, sintered together at a suitable temperature which will form aggregates of the material but is not sufficiently high to fuse and crystallize it to an abrasive condition. The aggregates of sintered clay particles thus made are found to be without appreciable abrasive qualities sufficient to detrimentally affect the metal tooth holding portion of the saw. It is primarily essential, however, that the gripping or holding surfaces of this base section of the segment be devoid of any abrasive material in order that the clamping wedge block and the metal side walls of the saw tooth socket will not be subjected to detrimental abrasion during replacement or tightening of the saw tooth segment therein.

Referring to the drawing, which shows several embodiments of the invention, there is illustrated in Fig. 1 an abrasive saw tooth segment 10 having a grinding or abrasive section 11 which is composed of bonded granular abrasive material, such as crystalline alumina or silicon carbide grains, and a non-abrasive shank or mounting portion 12 integrally united and bonded thereto. The abrasive section 11 is preferably thicker in cross section than the saw blade, and the non-abrasive shank portion 12 is tapered and of dovetailed shape corresponding to the dovetailed tooth receiving recess in the saw blade. As shown in Fig. 2, the abrasive section 11 has an outer, plane, peripheral surface 13, which constitutes the sawing or cutting edge of the tooth and has the maximum thickness of the tooth section, and the segment tapers from this thick outer sawing edge to the narrower thickness at the shank indicated at 15 which is clamped in the tooth receiving socket in the saw blade. The shank 12 is formed with double-beveled side and bottom edges adapted to fit into V-shaped grooves at the sides of the saw socket and the grooved edge of the fastening wedge or key.

In Fig. 3 of the drawing, I have illustrated a further modification of a saw tooth construction embodying the invention, comprising a saw tooth segment 20 having an abrasive or sawing section 21 and shank portion 22, in which the grinding section 21 and the inner body portion of the shank 22 are composed of bonded abrasive grains united together into an integral mass. Formed integrally with the abrasive shank 22 are the non-abrasive gripping or holding portions 23, 24 and 25, respectively, which are molded to the bottom and lower side edge portions of the shank 22. The non-abrasive portions 23, 24 and 25 are preferably composed of the material, of the type employed for bonding the abrasive grains in the abrasive section, and is mixed with a suitable non-abrasive filling material, such as wood flour or clay grog. As shown in Fig. 4, the segment tooth tapers from a thicker outer cutting edge 27 to a thinner inner edge 28 which is clamped in the saw socket.

As a specific example of a composition which will be suitable for making a resinoid bonded saw tooth segment, I may utilize the following ingredients in the proportions specified:

*Abrasive section*

| | Per cent by weight |
|---|---|
| Silicon carbide grains 14 mesh and finer | 88 |
| Resinoid bond (bakelite) | 12 |

*Non-abrasive section*

| | Per cent by weight |
|---|---|
| Fire clay grog 200 mesh and finer | 83 |
| Resinoid (bakelite) | 17 |

The resinoid mixtures which compose the abrasive and non-abrasive sections may be molded under conditions of combined heat and pressure to form the mass to the mold shape, or they may, if desired, be molded in accordance with the standard cold molding procedure utilized in the grinding wheel art, as set forth in the patents to Martin No. 1,626,246 of April 26, 1927 and Brock No. 1,537,454 of May 12, 1925. Suitable resinoid molding materials which are standard in the art may be employed for this purpose; however, it is preferred to employ a synthetic condensation product belonging to the phenolic group, such as those known under the trade-marks "Bakelite", "Durez" and the like, or it may be of the phthalic glycerol type of resinoid, such as that known by the trade-mark "Glyptal". The resinoid material may be used either in a liquid condition or in the powdered form, depending upon the particular molding requirements to be employed.

An example of a satisfactory saw tooth segment embodying the invention and made of a shellac composition is one made up as follows:

*Abrasive section*

| | Per cent by weight |
|---|---|
| Abrasive material 14 mesh and finer | 89 |
| Shellac | 11 |

*Non-abrasive section*

| | Per cent by weight |
|---|---|
| Fire clay grog 200 mesh and finer | 85 |
| Shellac | 15 |

As an illustration of one particular method of making this saw tooth segment having both the abrasive and non-abrasive sections, in which the bonds are resinoid or shellac, I may first form the abrasive portion of a mixture of the abrasive material, such as crystalline alumina or silicon carbide grains, and resinoid or shellac bond, in the proper proportions for making the finished article. A removable thin metal partition of the proper shape and surface contour is then placed in a mold of the desired tooth shape and at the correct position in the mold cavity to divide it into chambers or compartments corresponding in shape and position to the desired tooth sections to be made. When the partition has been placed in position, the mold chamber which forms the abrasive or sawing section of the tooth is filled with the abrasive mixture, after which the partition is removed from the mold and the intervening space between the abrasive section and the mold walls is filled in with the non-abrasive mixture, thereby entirely filling up the mold cavity. The mass may then be subjected to heat and pressure, in accordance with the usual resinoid or shellac molding practice in order to compact the material and cause it to become united into an integral mass. The molded article may be suitably heat treated to heat set and finally mature the bond.

If the saw tooth segment is to be made of a rubber body having abrasive and rubber at one end and rubber alone or rubber with a filler at the base section or the gripping edge portions, the tooth may be made in accordance with the following procedure. For example, one particular rubber composition for a saw tooth segment may be made up of the following ingredients and proportions:

*Abrasive section*

| | Per cent by weight |
|---|---|
| Silicon carbide grains 14 mesh and finer | 89 |
| Rubber | 11 |

*Non-abrasive section*

| | Per cent by weight |
|---|---|
| Fire clay grog 200 mesh and finer | 84 |
| Rubber | 16 |

I may first form the abrasive portion of a mixture of rubber, abrasive grains, sulfur, with or without a vulcanization accelerating agent, by incorporating the ingredients into the rubber bond by means of suitable mixing rollers, in accordance with standard rubber procedure, to form a rubber strip having the abrasive grains and sulfur interspersed throughout the rubber body. In a similar manner, the materials from which the non-abrasive section of the segment is to be made may also be formed into another rubber strip with the sintered fire clay grog intermixed throughout the crude rubber body. These operations may be accomplished in accordance with the standard rubber compounding practice by passing the crude rubber strip repeatedly through heated rollers a sufficient number of times, after which the material is then rolled into strips of desired thickness and cut to the dimensions and shape corresponding with that of the respective sections to be made. The segment may be formed by placing the properly shaped rubber strips of abrasive and non-abrasive composition in a mold, after which the mass is subjected to pressure and heat in order to compact the sections and cause them to cohere and adhere together. The segment is subjected to vulcanization in a suitably heated apparatus in accordance with the usual practice to vulcanize the rubber and unite the sections into an integral body made up of hard, vulcanized rubber having the abrasive and non-abrasive sections, embodied in this invention, in which the lines of demarkation between the sections are not pronounced owing to the intermingling of the respective rubber bonds at the junction planes thereof and adapted for stone cutting purposes. The non-abrasive shank or segment clamping portions thus made are smooth-faced and of accurate dimensions so that they will fit the sides of the tooth receiving recess in saw blade and the wedge member correctly when mounted.

In mounting the abrasive saw tooth segments in a stone cutting saw, the stone saw may be either of the circular rotary type or of the straight reciprocating type, with a plurality of tooth receiving openings or recesses adapted to receive and retain the tooth segments. As illustrated in Fig. 5, a segment 10 and of the type indicated in Fig. 1, is shown in one form of standard saw blade mounting employed in the art. The tooth receiving recesses or sockets in the saw blade 30 have tapered side walls so that the socket is substantially trapezoidal in form. The wedge 31 is arranged to force the tooth segment outwardly and tighten the shank along the non-abrasive side portions which are held in intimate contact with the guiding walls of the socket.

Having thus described the invention, what is claimed as new and desired to secure by Letters Patent is:

1. A saw tooth adapted to be removably mounted and wedgingly clamped in a socket of a saw blade comprising a molded body having an abrasive portion formed of abrasive grains united together integrally by a bond and adapted to be exposed outside the saw socket, and a molded, non-abrasive, non-metallic base portion integral with the abrasive portion and shaped to be mounted in the saw socket, said base portion having a plurality of holding surfaces shaped to directly engage and fit the respective tooth holding portions of the saw socket and the clamping wedge employed therein.

2. A saw tooth adapted to be removably mounted and wedgingly clamped in a socket of a saw blade comprising a molded body provided with an abrasive portion formed of abrasive grains united together integrally by an organic bond and adapted to be exposed outside the saw socket, and a non-abrasive base portion integral with the abrasive portion and shaped to be mounted in the saw socket, said base portion being formed of a molded, organic material compounded with a non-abrasive filler and having a strength substantially as great as that of the abrasive section.

3. A saw tooth adapted to be removably mounted and wedgingly clamped in a socket of a saw blade comprising a molded body having an abrasive portion formed of abrasive grains united together integrally by an organic bond and adapted to be exposed outside the saw socket for a cutting operation, and a non-abrasive holding portion integral with the abrasive portion and shaped to be mounted in the saw socket, said non-abrasive holding portion being composed of finely divided non-abrasive material united together into an integral mass by an organic bonding material of the type employed for bonding the granular abrasive material in the abrasive portion of the tooth.

4. A saw tooth adapted to be removably mounted and wedgingly clamped in a socket of a saw blade comprising a molded body having an abrasive portion formed of abrasive grains united together integrally by an organic bond and adapted to be exposed outside the saw socket, and a non-abrasive holding portion integral with the abrasive portion and shaped to be mounted in the saw socket, said non-abrasive holding portion being composed of finely divided non-abrasive material bonded together into an integral mass by an organic bonding material.

5. A saw tooth adapted to be removably mounted and wedgingly clamped in a socket of a saw blade comprising a molded body provided with an abrasive portion formed of abrasive grains united together integrally by an organic bond and adapted to be exposed outside of the saw socket for a grinding operation, and a non-abrasive base portion integral with the abrasive portion and shaped to be mounted in the saw socket, the tooth being tapered toward the base portion so that a section parallel to the peripheral grinding surface of the abrasive portion contains parallel edges along its length, and said base portion of the tooth being of dove-tail shape and composed of molded non-abrasive organic material which serves to provide a plurality of non-abrasive holding surfaces surrounding the bottom and lower side edges of the tooth.

6. In a stone saw having a plurality of saw teeth adapted to be removably mounted and wedgingly clamped in a series of sockets in the saw blade, the combination of a saw blade having a socket in the edge thereof, a clamping wedge therein, and a replaceable cutting tooth secured in the socket, said tooth comprising a molded body having an abrasive portion of organic bonded abrasive grains projecting beyond the edge of the saw blade for a cutting operation and provided with a non-abrasive holding portion of molded organic material integrally united with the abrasive portion and adapted to directly engage and fit the walls of the socket and the clamping wedge therein whereby the tooth is rigidly held in place without detrimental abrasion and wear on the saw parts under conditions of use.

DUANE E. WEBSTER.